UNITED STATES PATENT OFFICE.

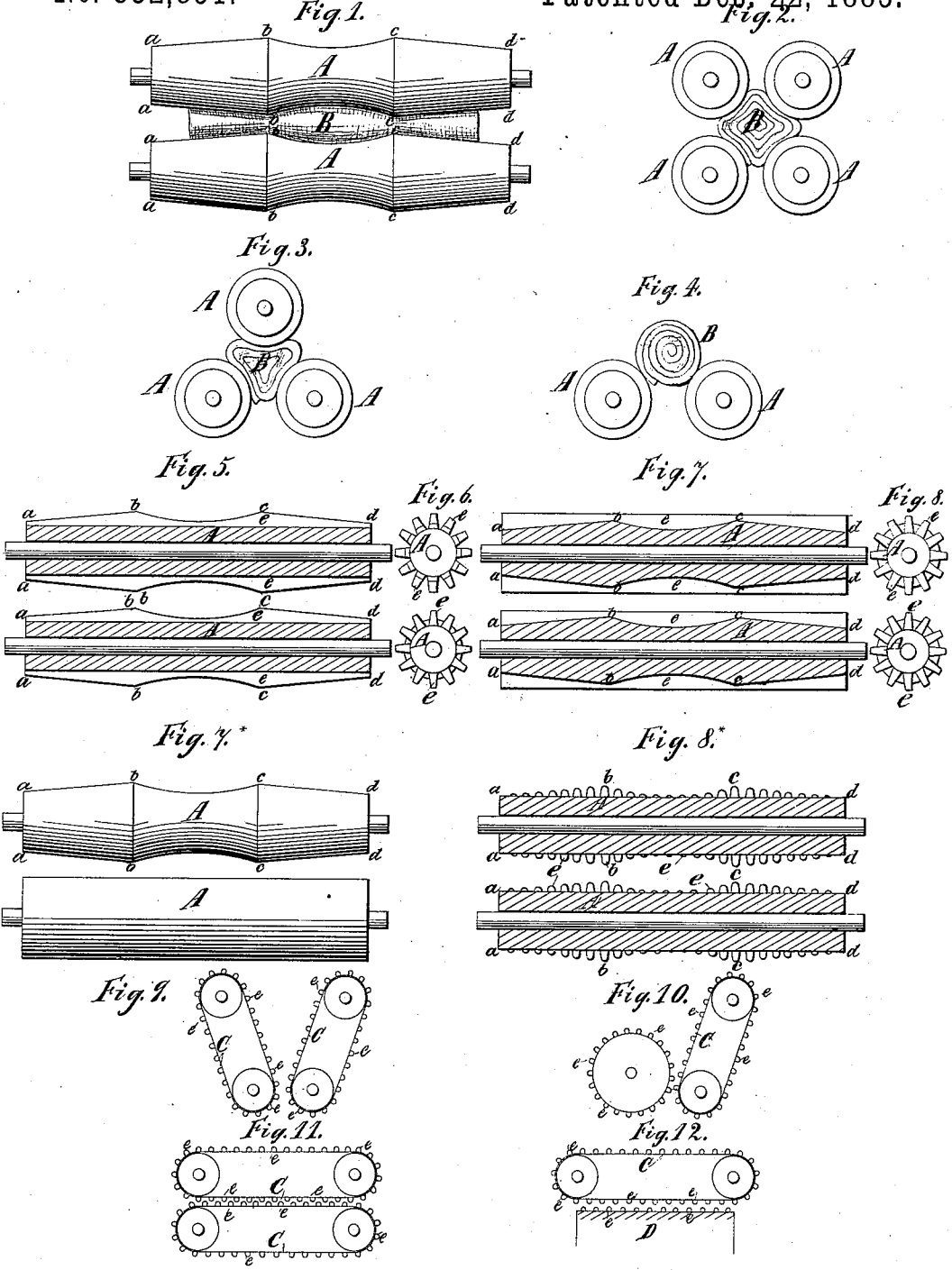

JOHN T. WARING, OF YONKERS, NEW YORK.

MACHINERY FOR FELTING HAT-BODIES, &c.

SPECIFICATION forming part of Letters Patent No. 332,851, dated December 22, 1885.

Application filed April 6, 1885. Serial No. 161,257. (No model.)

*To all whom it may concern:*

Be it known that I, JOHN T. WARING, a citizen of the United States, residing at Yonkers, in the county of Westchester and State of New York, have invented a new and useful Improvement in Machinery for Felting Hat-Bodies and other Articles, of which the following is a specification, reference being had to the accompanying drawings.

This invention relates to the profile form of the rollers and other equivalent working surfaces or members of machines used in the various stages of the felting process for subjecting a roll of hat-bodies or other articles to the rolling operation by which the felting is effected.

In my Reissued Letters Patent No. 9,683, dated April 26, 1881, I have described and claimed rollers and other working-surfaces having, in a direction transverse to the working movement, a profile of such concave, curved, or taper form as to produce between them a pocket or cavity which is larger or wider at the middle of the length of such profile and tapers or is contracted toward the ends thereof, the object being to prevent the extension in a longitudinal direction of the roll of hat-bodies or other articles placed between the said surfaces. Long-continued use of such rollers and working-surfaces has demonstrated their great superiority for almost all kinds of work over the old-fashioned ones having straight profiles, and although it is found generally better to construct the rollers or working surfaces or members with such profiles that the cavities provided between them are contracted from the middle toward the ends, I have discovered that for some kinds of work it is not desirable that the contraction continue all the way to the ends of the cavities, but that, on the contrary, the cavities should be wider at or near the ends than at some distance therefrom, in order to relieve the folded or crozed parts of the hat-bodies or other articles from too much pressure; and my present invention consists in the construction of the rollers or other working members, as hereinafter described, of such profile in a direction transverse to their working movement that the cavity formed between them is made wider near the ends or margins of such members; also, in the construction of the said rollers or working members with such profile, as hereinafter described, that the cavity formed between them is larger at the middle of the length of the profile, thence diminishes for a certain distance, and thence increases in width toward the ends thereof.

The invention is applicable to all kinds of felting-machines in which the articles to be felted are subjected to a rolling operation—as, for instance, those in which the working-surfaces are formed by combinations of two or more rollers, those in which the said surfaces are formed by combinations of two or more endless belts or aprons, those in which the said surfaces are formed by combinations of rollers with endless belts or aprons, and those in which said surfaces are composed of endless belts or aprons and stationary beds.

The accompanying drawings illustrate several methods of carrying out my invention.

Figure 1 is a longitudinal view of two rollers, showing the form of the cavity between them. Figs. 2, 3, and 4 are end views showing different well-known ways in which combinations of rollers are made in felting-machines, and in which my improved rollers may be combined. Fig. 5 is a longitudinal section, and Fig. 6 an end view, of two rollers illustrating one of the numerous modifications of which my invention is capable. Fig. 7 is a longitudinal section, and Fig. 8 an end view, of two rollers illustrating another modification. Fig. 7* is a side view, and Fig. 8* an end view, of two rollers illustrating another modification. Figs. 9, 10, 11, 12 are side views illustrative of different known kinds of felting-machines in which the working-surfaces are composed wholly or in part of or attached to endless aprons, and to which my invention is applicable.

I will first refer to Fig. 1, which represents two smooth rollers without lags. In this figure it will be seen that the longitudinal profiles *a b c d* of the rollers A A are concave between the lines *b* and *c*, and from those lines they are of convex or taper or sloping form toward their ends, the circumference of the rollers thus being made smaller at the middle of their length, thence increasing for some distance therefrom, thence diminishing toward the ends, and the cavity formed between the said rollers for the reception of the roll B of hat-bodies or other articles to be felted being wide at the middle of its length, thence contracted for a certain distance toward the ends, and thence gradually widening to the ends.

Figs. 5 and 6 show rollers the bodies of which are cylindrical, and are furnished with lags *e e*, which have a profile, *a b c d*, of the form hereinabove described with reference to Fig. 1.

Figs. 7 and 8 show rollers the bodies of which have profiles *a b c d* of the form hereinabove described, and which are furnished with straight lags.

Figs. 7* and 8* show rollers, one of which is of the same form as those represented in Fig. 1, and the other of which is a plain cylinder. It will be seen that the space or cavity between these two rollers is wide at the middle, contracted for a certain distance toward the ends, and thence wider to the ends, essentially like that between the rollers shown in Fig. 1.

Rollers having profiles *a b c d*, as described, may be used in the well-known kinds of felting-machines in common use having four rollers arranged as shown in Fig. 2, or having these rollers arranged as shown in Fig. 3, or in those machines in which two rollers are combined to form between them an open trough-like cavity, as described and claimed in my United States Letters Patent No. 227,329, dated May 4, 1880, and illustrated by Fig. 4 of the accompanying drawings.

In machines of the kind represented in Fig. 9 and of the kind represented in Fig. 11, in which the working-surfaces are composed of two endless aprons, C C, having lagged faces, the lags *e e*, attached to the aprons and constituting the principal working-surfaces, have their profiles in a direction transverse to their working movement and corresponding with the longitudinal profiles of the rollers, like the lags shown in Figs. 5 and 6 and described with reference thereto.

In machines of the kind shown in Fig. 10 either the apron C or the roller A, or both of them, may have lags of similar longitudinal profile.

In machines of the kind shown in Fig. 12 the endless apron C and the bed D may have the lags *e e* on their surfaces of similar profile, *a b c d*, or the bed itself might have a transverse profile of that form, to form between the bed and the apron a cavity or space of the form described and illustrated at B in Fig. 1.

The profile *a b c d* of the rollers or other working-surfaces need not be continuous. It may be interrupted, as shown in Fig. 8**, which represents a cylindrical roller having on its surface a series of nodules of such various protuberance that lines drawn lengthwise of the rollers and touching the points of said nodules would have the profile of the form described.

The several rollers or other working members of machines having profiles of the form described may run at equal or unequal velocities, and the said members, when having lagged surfaces, may have the lags spaced equally or unequally and either of the same or of different width, thickness, or degree of protuberance.

It will be seen that in all the examples of my invention in which lags are represented the lags are lower at the middle of their length, thence increasing in height to a certain distance from the ends, and thence again having their height diminished toward the ends. It will also be seen that in all the examples of the invention in which rollers are used, whether the rollers are plain or lagged, the rollers have a circumference which is smaller in the middle of their length, thence increases a certain distance therefrom, and thence diminishes toward the ends.

What I claim as my invention, and desire to secure by Letters Patent, is—

1. A felting-machine in which the whole or a portion of its working-surfaces have, in a direction transverse to their working movement, a profile which gives the cavity between the said surfaces a greater width at the ends of the working parts of said profile than at a distance from said ends, substantially as and for the purpose herein described.

2. A felting-machine in which the whole or a portion of its working-surfaces have, in a direction transverse to their working movement, a profile of concave and convex, taper or sloping form, whereby the cavity or space between said surface is made larger at the middle of the length of such profile, thence contracted to a certain distance from the ends, and thence wider toward the ends thereof, substantially as herein described.

3. A felting-machine roller having its end portions tapered, substantially as herein shown and described.

4. A felting-machine having its working-surfaces of ribbed or lagged construction, and having the lags lower at the middle of their length, thence increasing in height to a certain distance from their ends, and thence again having their height diminished toward the ends, substantially as herein described.

5. A felting-machine roller having a less circumference at the middle of its length, thence increasing in circumference for a certain distance therefrom, and thence diminishing in circumference toward the ends, substantially as herein described.

JOHN T. WARING.

Witnesses:
FREDK. HAYNES,
MATTHEW POLLOCK.